(12) United States Patent
Yamaguchi

(10) Patent No.: US 10,295,074 B2
(45) Date of Patent: May 21, 2019

(54) CHECK VALVE

(71) Applicant: PIOLAX, INC., Yokohama-shi (JP)

(72) Inventor: Kosei Yamaguchi, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 89 days.

(21) Appl. No.: 15/352,170

(22) Filed: Nov. 15, 2016

(65) Prior Publication Data

US 2017/0138494 A1    May 18, 2017

(30) Foreign Application Priority Data

Nov. 18, 2015 (JP) ................................. 2015-225919

(51) Int. Cl.
| | | |
|---|---|---|
| *B60K 15/03* | (2006.01) | |
| *F16K 17/196* | (2006.01) | |
| *F16K 39/02* | (2006.01) | |
| *F16K 15/02* | (2006.01) | |
| *F16K 27/02* | (2006.01) | |

(Continued)

(52) U.S. Cl.
CPC ...... *F16K 17/196* (2013.01); *B60K 15/03519* (2013.01); *F16K 15/026* (2013.01);
(Continued)

(58) Field of Classification Search
CPC .... B60K 15/03519; B60K 2015/03256; F16K 15/02; F16K 15/025; F16K 15/026; F16K 15/148; F16K 17/18; F16K 17/19; F16K 17/196; F16K 24/00; F16K 24/04; F16K 24/06; F16K 27/0209; F16K 39/024; Y10T 137/7772; Y10T 137/7773

(Continued)

(56) References Cited

U.S. PATENT DOCUMENTS 2,679,946 A * 6/1954 Friend ................ B60K 15/0406
137/493.9
3,799,185 A * 3/1974 Milnes .................. F16K 15/148
137/102

(Continued)

FOREIGN PATENT DOCUMENTS

| | | | | |
|---|---|---|---|---|
| DE | 2418135 A1 | * | 10/1975 | .......... F01P 11/0238 |
| GB | 745250 A | * | 2/1956 | .......... F16K 17/003 |
| GB | 2532338 A | | 5/2016 | |
| JP | S 56-131067 U | | 10/1981 | |

OTHER PUBLICATIONS

Great Britain Search Report Under Section 17(5) in GB Application No. 1619085.2 dated May 15, 2017.

*Primary Examiner* — Mary E McManmon
*Assistant Examiner* — Richard K. Durden
(74) *Attorney, Agent, or Firm* — McGinn I.P. Law Group, PLLC.

(57) ABSTRACT

A check valve includes a valve case, a positive pressure valve, a spring, and a negative pressure valve. The positive pressure valve is slidably disposed in a valve chamber of the valve case. The spring urges the positive pressure valve to abut on a positive pressure valve seat of the valve case. The negative pressure valve is on the positive pressure valve to abut on a negative pressure valve seat of the positive pressure valve. The negative pressure valve closes a communicating passage in the positive pressure valve in a normal state, and opens it when a pressure in the fuel tank falls to a predetermined value or less.

11 Claims, 10 Drawing Sheets

(51) Int. Cl.
  *F16K 15/14* (2006.01)
  *B60K 15/035* (2006.01)
(52) U.S. Cl.
  CPC ........ *F16K 15/148* (2013.01); *F16K 27/0209* (2013.01); *F16K 39/024* (2013.01); *B60K 2015/03256* (2013.01); *Y10T 137/7773* (2015.04)
(58) Field of Classification Search
  USPC .......................................... 137/493.1, 493.2
  See application file for complete search history.

(56) References Cited

U.S. PATENT DOCUMENTS

| | | | | |
|---|---|---|---|---|
| 3,971,406 | A * | 7/1976 | Inada | B60K 15/03519 137/493.4 |
| 4,007,758 | A * | 2/1977 | Gray | A62B 18/10 137/472 |
| 4,805,663 | A * | 2/1989 | Szlaga | G05D 7/0106 137/493.2 |
| 4,982,757 | A * | 1/1991 | Ohasi | B60K 15/03519 137/202 |
| 4,986,310 | A * | 1/1991 | Bailey | F16K 15/148 137/859 |
| 6,196,258 | B1 * | 3/2001 | Araki | B60K 15/03504 137/493.4 |
| 6,994,103 | B2 * | 2/2006 | Takahashi | F16K 24/044 137/202 |
| 2011/0162732 | A1 * | 7/2011 | Biel | F16K 15/026 137/538 |

* cited by examiner

CHECK VALVE

CROSS-REFERENCE TO RELATED APPLICATION(S)

This application claims priority from Japanese Patent Application No. 2015-225919 filed on Nov. 18, 2015, the entire contents of which are incorporated herein by reference.

FIELD

The present invention relates generally to a check valve mounted on a fuel tank of an automobile or the like and used for adjusting the pressure in the fuel tank.

BACKGROUND

In general, a check valve is mounted on a fuel tank of an automobile or the like, the check valve being arranged to make a fuel vapor flow outside to prevent the fuel tank from bursting when the pressure in the fuel tank rises to a predetermined value or more while making the outside air flow in from the outside of the fuel tank to prevent the fuel tank from being crushed when the pressure in the fuel tank falls to a predetermined value or less with respect to outside air pressure.

JP-UM-S56-131067-B discloses a two-direction valve that includes two valves arranged to open in directions different from each other in a casing having two opening ports while at least one of the valves is made from resin, and a valve portion made from rubber is fixed to the valve via a thin metallic plate.

The valve portion can be made from rubber, includes an annular shape, and a step is provided to the outer rim of the valve portion. The valve is arranged to open when the pressure in the fuel tank rises. The valve has a circular shape, and includes a cylindrical wall standing from the outer rim of the upper end portion and a protrusion protruding from the cylindrical wall in the radial inner direction. The thin metallic plate has an annular shape, and the rim thereof is bent to have the approximate shape of the letter "L". When the step of the valve portion is pressed from above, the inner rim of the thin metallic plate and the outer rim of the thin metallic plate is engaged with the lower surface of the protrusion of the valve, and the valve portion is fixed to the valve via the thin metallic plate.

The two-direction valve has the configuration such that the valve portion is fixed to the valve via the thin metallic plate as described above. However, assembly work such as inserting the thin metallic plate into the cylindrical wall of the valve to make the outer rim of the thin metallic plate sink be under and engaged with the lower surface of the protrusion of the valve is required. Further, assembly work such as inserting the valve portion into the inner rim of the thin metallic plate to press the step of the valve portion with the inner rim of the thin metallic plate may be also required. Thus, the two-direction valve may not be efficiently assembled with its complicated structure.

SUMMARY

An aspect of the present invention provides a check valve including: a valve case including: a first connecting portion connected with a pipe which is to be communicated with a fuel tank; a second connecting portion connected with a pipe which is to be communicated with a canister disposed outside the fuel tank; a valve chamber formed inside the valve case; and a positive pressure valve seat provided in a portion ranging from the valve chamber to the first connecting portion; a positive pressure valve slidably disposed in the valve chamber to abut on and separate from the positive pressure valve seat; and a spring disposed in the valve case configured to urge to make the positive pressure valve abut on the positive pressure valve seat, and to be compressed to thereby open the positive pressure valve when a pressure in the fuel tank rises to a predetermined value or more, wherein the positive pressure valve includes: a valve main body; an annular sealing member made from an elastic resin material, and mounted on the valve main body so as to abut on and separate from the positive pressure valve seat; and a retainer mounted on the valve main body so as to sandwich the annular sealing member with the valve main body, wherein the valve main body includes: a placing face on which the annular sealing member is placed, wherein the retainer includes: a communicating passage disposed on an inside diameter side of the annular sealing member; a sandwiching portion formed to sandwich the annular sealing member with the placing face of the valve main body; and a negative pressure valve seat which communicates with the communicating passage, and wherein the check valve further includes a negative pressure valve made from an elastic resin material, and mounted on the retainer so as to abut on and separate from the negative pressure valve seat, such that the negative pressure valve closes the communicating passage in a normal state by abutting on the negative pressure valve seat, and opens the communicating passage when the pressure in the fuel tank falls to a predetermined value or less.

There may be provided the check valve, wherein the negative pressure valve seat is provided to the sandwiching portion.

There may be provided the check valve, wherein the negative pressure valve includes a flange portion having a circular shape, and wherein the flange portion has an outside diameter larger than an inside diameter of the annular sealing member and smaller than an outside diameter of the annular sealing member in a state where an axial center of the valve main body, a center of the annular sealing member and a center of the flange portion of the negative pressure valve are aligned.

There may be provided the check valve, wherein the valve main body includes a retainer fitting portion disposed at a position corresponding to an inside diameter side of the annular sealing member being placed on the placing face, and configured to fit the retainer.

There may be provided the check valve, wherein the negative pressure valve includes a flange portion having a circular shape, and a shaft portion extending from a center on a back surface of the flange portion, and wherein the retainer includes a negative pressure valve-fitting portion into which the shaft portion of the negative pressure valve fits, the negative pressure valve-fitting portion being disposed on an inner side of a portion of the retainer to fit the retainer fitting portion.

With the above-described check valve, the annular sealing member can be sandwiched between the sandwiching portion of the retainer and the placing face by mounting the retainer on the valve main body in a state where the annular sealing member is placed on the placing face of the valve main body, and the annular sealing member and the negative pressure valve can be attached to the valve main body with the use of the retainer by mounting the negative pressure valve on the retainer. Thus, the check valve has a relatively simple structure while having improved workability because the annular sealing member, the retainer, and the negative pressure valve can be attached in the same direction to the valve main body.

BRIEF DESCRIPTION OF DRAWINGS

FIG. 3A is a perspective view of the valve main body. FIG. 3B is a perspective view of the valve main body seen from a different direction from FIG. 3A.

DETAILED DESCRIPTION

A check valve according to one embodiment will be described referring to FIGS. 1 to 9.

Figure 1:
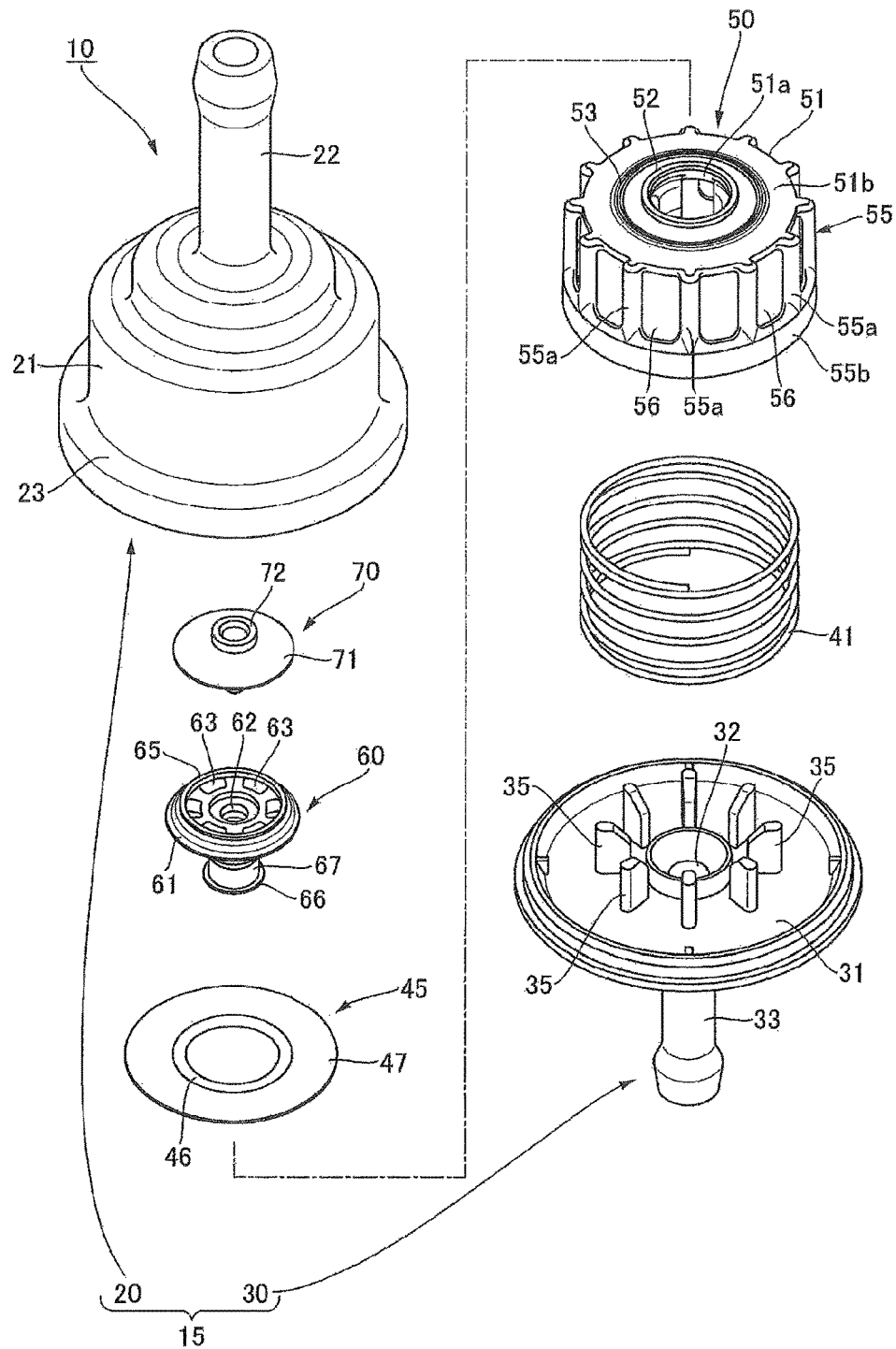
FIG. 1 is an exploded perspective view of a check valve according to one embodiment.
Figure 2:
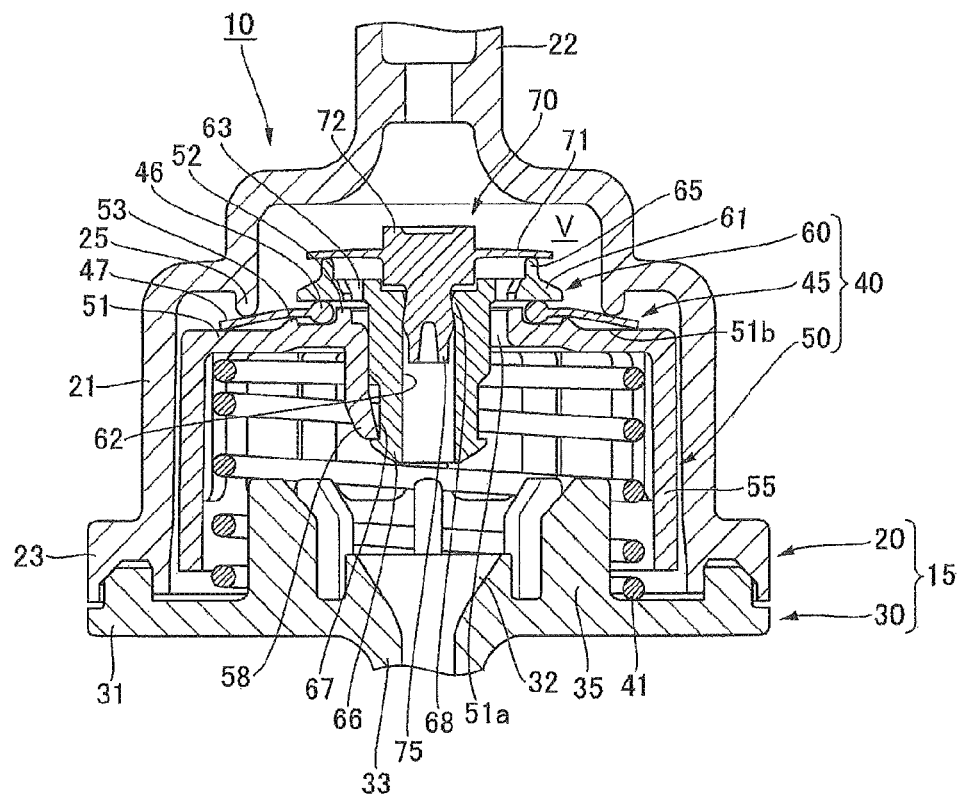
FIG. 2 is an enlarged cross-sectional view of relevant components of the check valve showing a state where the pressure in a fuel tank is normal.

As shown in FIGS. 1 and 2, a check valve 10 according to the present embodiment includes a valve case 15, a positive pressure valve 40, a spring 41 and a negative pressure valve 70 (see FIG. 2). The valve case 15 includes a case main body 20 and a sub-case 30. A valve chamber V and a positive pressure valve seat 25 are formed inside the valve case 15. The positive pressure valve 40 includes a valve main body 50, an annular sealing member 45, and a retainer 60. The positive pressure valve 40 is slidably housed in the valve chamber V to abut on and separate from the positive pressure valve seat 25. The spring 41 urges the positive pressure valve 40 toward the positive pressure valve seat 25. The negative pressure valve 70 is mounted on the positive pressure valve 40.

The case main body 20 of the valve case 15 includes a cylindrical body 21 and a first connecting portion 22. The cylindrical body 21 has a circular cylindrical shape and is opened at one end, and the first connecting portion 22 has a cylindrical shape and extends from the other end of the cylindrical body 21 so as to communicate with the inside of the cylindrical body 21, as shown in FIG. 1. A pipe (not illustrated) communicating with the fuel tank is connected with the first connecting portion 22. As shown in FIG. 2, the positive pressure valve seat 25, which has an annular rib shape, protrudes from the valve chamber V to the first connecting portion 22 on the inner periphery of the cylindrical body 21. The positive pressure valve 40 abuts on or separates from the pressure valve seat 25. An annular flange portion 23 for attachment to the sub-case 30 extends from the outer rim of the cylindrical body 21 on the opening side.

The sub-case 30 of the valve case 15 includes a lid member 31 having a disk shape including an opening portion 32 in its center that communicates with the outside of the fuel tank. The outer rim of the lid member 31 is joined to the annular flange portion 23 of the case main body 20 by welding or the like, whereby the sub-case 30 is attached to the case main body 20.

A second connecting portion 33 having a cylindrical shape extends from the rim on the outer surface side of the opening portion 32 in the lid member 31, and a pipe (not illustrated) communicating with a canister disposed outside the fuel tank is connected with the second connecting portion 33.

Plural ribs 35 protrude from the rim of the opening portion 32 on the inner surface side of the lid member 31 so as to be equally spaced radially with respect to the center of the lid member 31. The spring 41 is supported at one end by the outer peripheries of the ribs 35 and the bottom surface of the lid member 31, and a fuel vapor, air, or the like circulates between the adjacent ribs 35 and 35.

Next, the positive pressure valve 40 including the valve main body 50, the annular sealing member 45, and the retainer 60 will be described.

First, the annular sealing member 45 will be described. The annular sealing member 45 includes a thick portion 46 and a thin portion 47, as shown in FIGS. 1 and 2. The thick portion 46 has an annular shape on its inner side, and the thin portion 47 has a thin flange shape thinner than the thick portion 46 and extending in the radial outer direction from the rim of the thick portion 46. The rim of the thin portion 47 has a circular shape. The annular sealing member 45 is made from an elastic resin material such as rubber and elastomer.

Figure 3A:
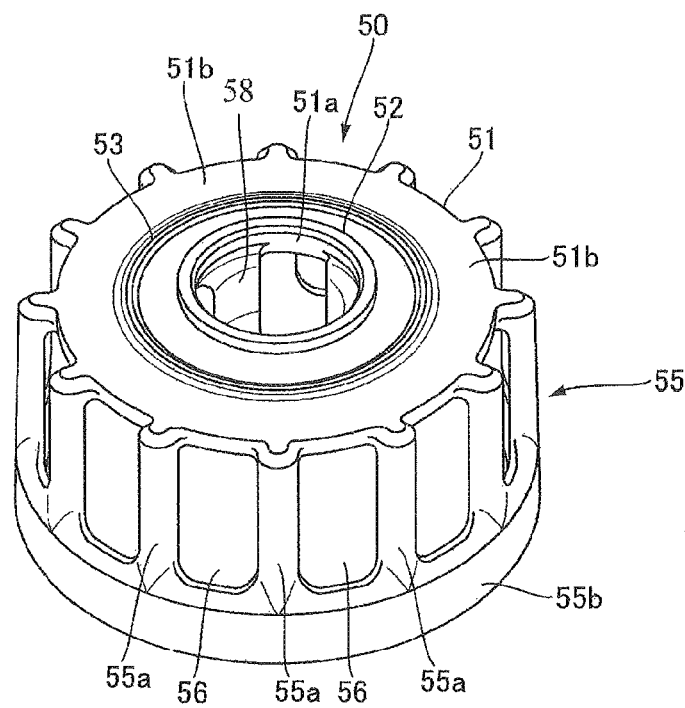
FIGS. 3A and 3B are views of a valve main body.

Next, the valve main body 50 will be described. As shown in FIG. 3, the valve main body 50 includes a base portion 51 and an outer peripheral portion 55. The valve main body 50 has an annular shape and including a through-hole 51a in its center. The outer peripheral portion 55 has a predetermined length extending from the outer rim of the base portion 51 toward the back surface of the base portion 51. The spring 41 is inserted to be disposed in the inner periphery of the outer peripheral portion 55. The top surface of the base portion 51 functions as a placing face 51b for placing the annular sealing member 45 thereon.

Figure 5:
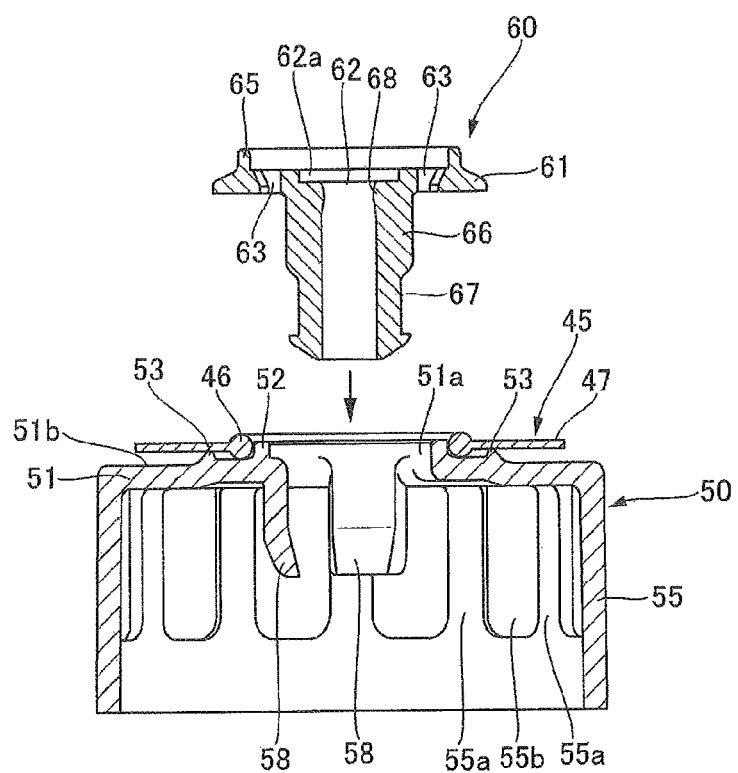
FIG. 5 is an explanatory view of the check valve showing a first process at the time when the annular sealing member, the retainer, and the negative pressure valve are attached to the valve main body.

A supporting protrusion 52 having an annular shape protrudes from the rim on the top side of the through-hole 51a of the base portion 51. As shown in FIG. 5, the supporting protrusion 52 is lower than the thickness of the thick portion 46 of the annular sealing member 45, and is capable of sandwiching the annular sealing member 45 between the sandwiching portion 61 of the retainer 60 and the placing face 51b in a state where the annular sealing member 45 is placed on the placing face 51b. The supporting protrusion 52 is inserted to be disposed on the inner periphery side of the thick portion 46 of the annular sealing member 45 to limit positional deviation of the annular sealing member 45 in the radial direction.

Figure 8:
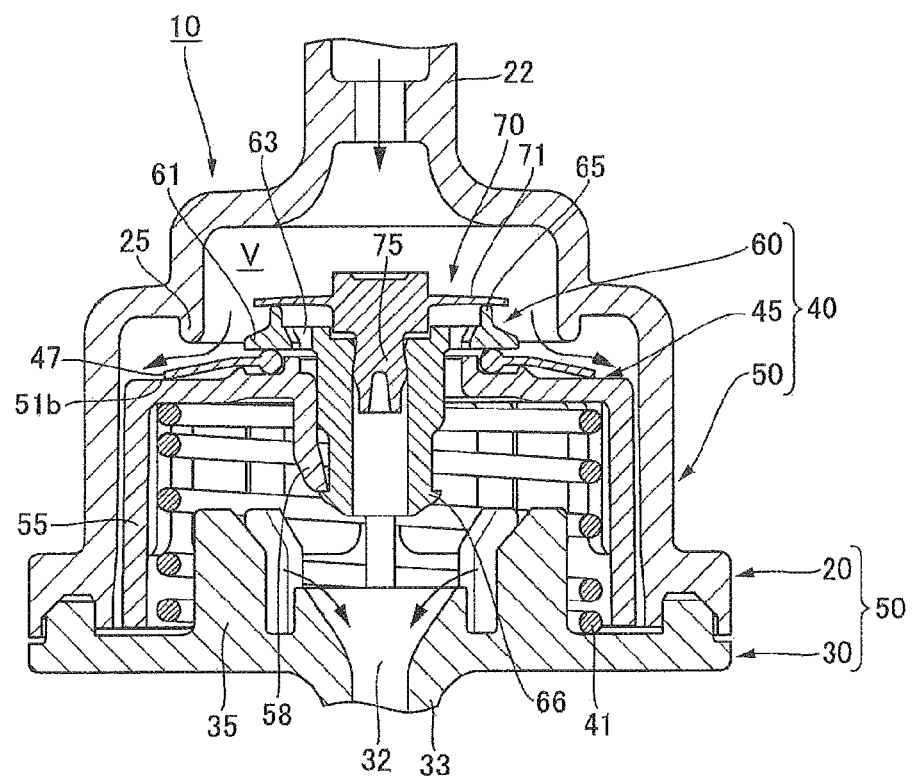
FIG. 8 is an enlarged cross-sectional view of relevant components of the check valve showing a state where the pressure in a fuel tank rises to a predetermined value or more.

An abutting protrusion 53 protrudes from the outer periphery of the through-hole 51a and the supporting protrusion 52 on the top side surface of the base portion 51. The abutting protrusion 53 has an annular shape and is arranged to abut on the back surface of the thin portion 47 of the annular sealing member 45. The abutting protrusion 53 causes the thin portion 47 of the annular sealing member 45 to separate from the placing face 51b with a predetermined space when the positive pressure valve 40 slides against the urging force of the spring 41 and the positive pressure valve seat 25 opens as shown in FIG. 8.

In the present embodiment, the outer peripheral portion 55 is disposed a predetermined space apart from the rim of the base portion 51, and includes plural columnar portions 55a having a predetermined length extending toward the back surface of the base portion 51 and a connecting portion 55b having an annular shape and connected with the distal end portions of the columnar portions 55a in the extending direction. Opening portions 56 having a long hole shape are provided between the adjacent columnar portions 55a and 55a to communicate with the interior space of the valve main body 50. For example, the outer peripheral portion 55 may be a cylindrical wall extending from the outer rim of the base portion 51 or the like, and is not limited specifically.

Figure 3B:
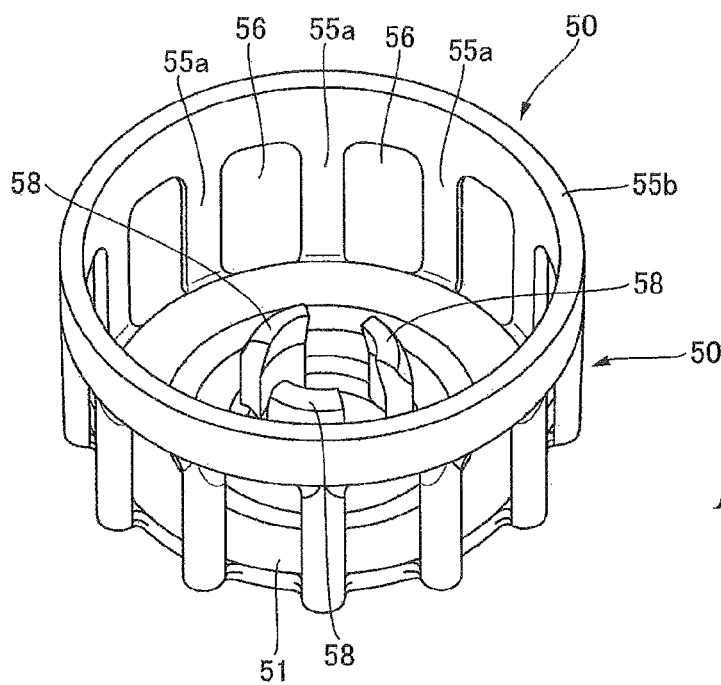

The valve main body 50 includes a retainer fitting portion disposed at a position on the inside diameter side of the annular sealing member 45 placed on the placing face 51b, and arranged to fit the retainer 60 (see FIG. 2). In the present embodiment, plural fitting pawls 58 having a three-clawed shape extend from the rim on the back side of the through-hole 51a of the base portion 51 of the valve main body 50, the rim being disposed on a more inside diameter side than the inner periphery of the thick portion 46 of the annular sealing member 45 as shown in FIGS. 2 and 3B, and the fitting pawls 58 functions as the "retainer fitting portion". The distal ends of the fitting pawls 58 fit the fitting recess portion 67 of the retainer 60 to be described later (see FIG. 2), whereby the retainer 60 is mounted on the valve main body 50. For example, the retainer fitting portion may be a pair of fitting pawls opposed to each other or the like, and is not limited specifically.

Figure 4:
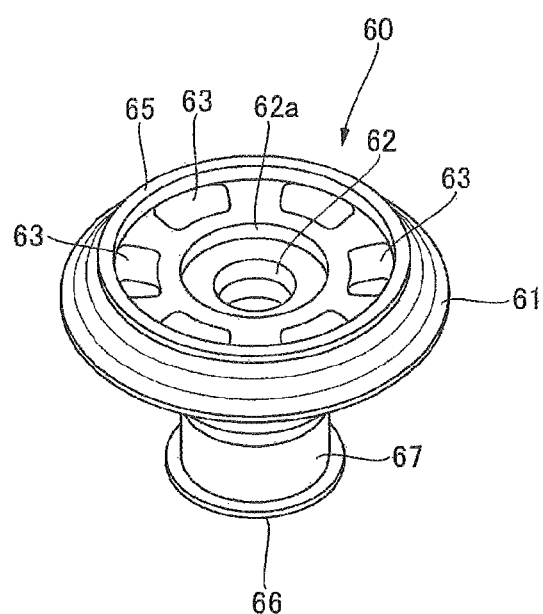
FIG. 4 is an enlarged perspective view of a retainer.
Figure 6:
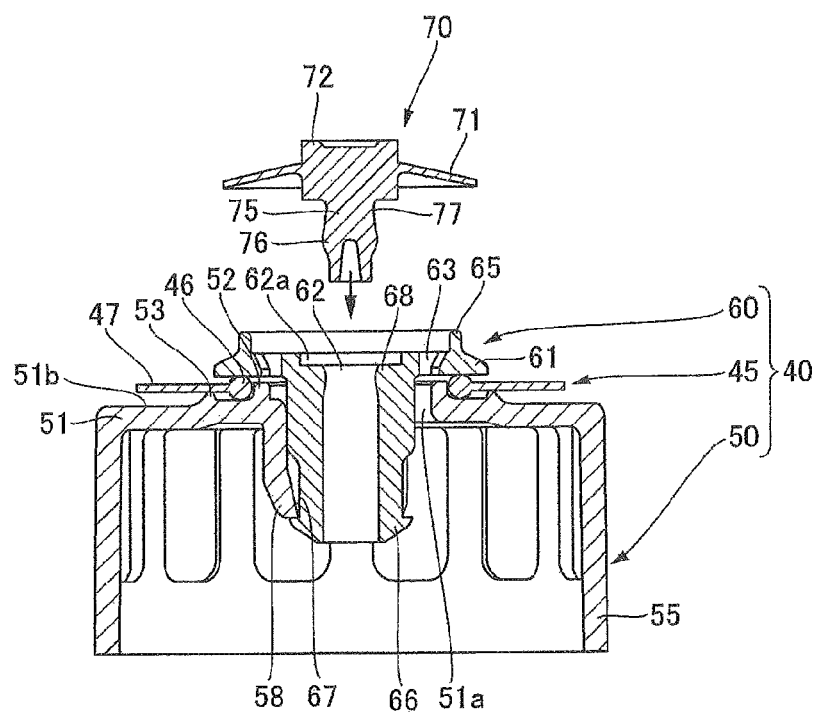
FIG. 6 is an explanatory view of the check valve showing a second process at the time when the annular sealing member, the retainer, and the negative pressure valve are attached to the valve main body.

Next, the retainer 60 will be described. As shown in FIGS. 4 to 6, the retainer 60 includes communicating passages 63 disposed on the inside diameter side of the annular sealing member 45, the sandwiching portion 61 arranged to sandwich the annular sealing member 45 with the placing face 51b of the valve main body 50, and a cylindrical portion 66 consecutively connected with the sandwiching portion 61.

The cylindrical portion 66 according to the present embodiment has a cylindrical shape and includes an insertion hole 62 in the center on the base end surface (see FIGS. 4 and 5). The shaft portion 75 of the negative pressure valve 70 is inserted into the insertion hole 62 (see FIG. 7). A recess portion 62a, into which a supporting portion 72 of the negative pressure valve 70 to be described later is inserted to be disposed, is provided on the rim of the insertion hole 62 on the base end surface of the cylindrical portion 66.

Figure 7:
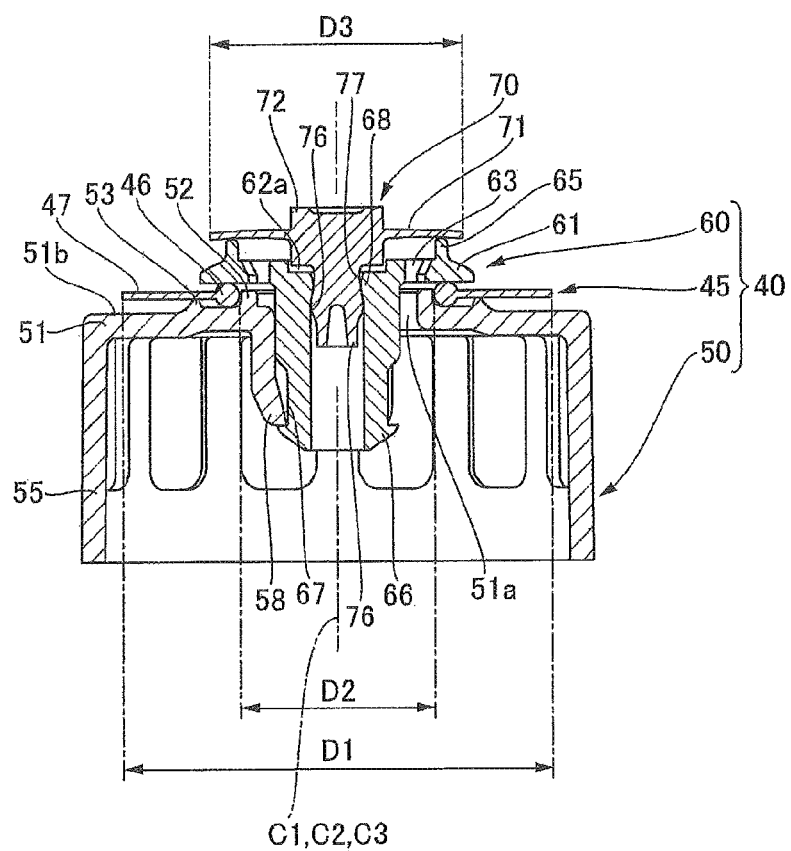
FIG. 7 is an explanatory view of the check valve showing a third process at the time when the annular sealing member, the retainer, and the negative pressure valve are attached to the valve main body.
Figure 9:
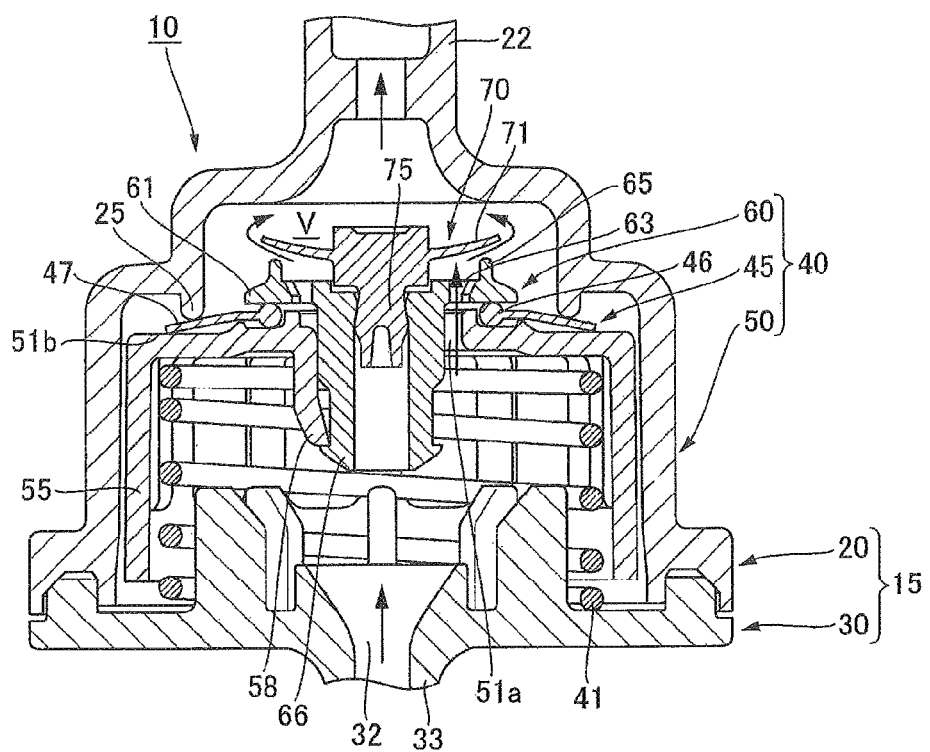
FIG. 9 is an enlarged cross-sectional view of relevant components of the check valve showing a state where the pressure in a fuel tank becomes negative pressure with respect to outside air pressure to fall to a predetermined value or less.

The sandwiching portion 61 has a flange shape extending in the radial outer direction from the outer periphery on the base end surface of the cylindrical portion 66. The sandwiching portion 61 includes the plural communicating passages 63 spaced at regular intervals in the circumferential direction on the outside diameter side of the insertion hole 62. The negative pressure valve seat 65 is disposed on the outside diameter side of the communicating passages 63 on the top surface of the sandwiching portion 61. The negative pressure valve seat 65 has an annular protruding shape surrounding the plural communicating passages 63 and communicating with the communicating passages 63. A flange portion 71 of the negative pressure valve 70 abuts on and separates from the negative pressure valve seat 65 to open and close the communicating passages 63 as shown in FIGS. 8 and 9. The communicating passages 63 communicate with the through-hole 51a of the positive pressure valve 40 in a state where the retainer 60 is mounted on the positive pressure valve 40 as shown in FIG. 7. In the present embodiment, the sandwiching portion 61 and the negative pressure valve seat 65 are formed in one piece. However, there is no limitation. For example, the negative pressure valve seat 65 may not be provided to the sandwiching portion 61 (e.g., the negative pressure valve seat 65 may be provided to the cylindrical portion on the base end surface).

The top surface of the outer rim of the sandwiching portion 61 has a tapered shape gradually lowering in the radial outer direction. The sandwiching portion 61 has an outside diameter larger than the outside diameter of the thick portion 46 of the annular sealing member 45, and is disposed so as to reach the top surface of the thin portion 47 beyond the outside diameter of the thick portion 46 when the thick portion 46 is sandwiched between the sandwiching portion 61 and the placing face 51b of the valve main body 50 as shown in FIG. 6. The back surface of the sandwiching portion 61, that is, the sandwiching surface arranged to sandwich the annular sealing member 45 with the placing face 51b has a flat surface (see FIGS. 5 and 6).

Turning back to the description of the cylindrical portion 66, the cylindrical portion 66 has a cylindrical shape including the insertion hole 62 on its base end face as described above, and includes the fitting recess portion 67 having a recess shape on the outer periphery at the distal end side in the extending direction of the cylindrical portion 66. The fitting pawls 58 that functions as a retainer fitting portion of the retainer 50 fit the fitting recess portion 67, whereby the retainer 60 is mounted on the valve main body 50. In the present embodiment, the fitting pawls 58 function as the retainer fitting portion.

The retainer 60 includes the insertion hole 62 disposed on the inner side of a portion of the retainer 60, the portion being arranged to fit the fitting pawls 58 that function as the retainer fitting portion of the valve main body 50, and a negative pressure valve-fitting portion 68 protruding into a chevron shape in the radial inner direction from the inner periphery of the insertion hole 62 on the base end side of the cylindrical portion 66 as shown in FIG. 6. The negative pressure valve-fitting portion 68 fits a fitting recess portion 77 on the outer periphery of the shaft portion of the negative pressure valve 70 to be described later, whereby the negative pressure valve 70 is mounted on the retainer 60 (see FIG. 7). Although the negative pressure valve-fitting portion 68 according to the present embodiment has a chevron protruding shape, the negative pressure valve-fitting portion 68 may have a protruding shape like a rib, which is not limited specifically.

As shown in FIG. 2, one end of the spring 41 is supported by the outer peripheries of the plural ribs 35 of the lid member 31 of the sub-case 30 and the bottom surface of the lid member 31. The other end is inserted into the inner side of the outer peripheral portion 55 of the valve main body 50 to abut on the back surface of the base portion 51 to be supported thereby. Thus, the spring 41 is disposed, while compressed, between the bottom portion of the lid member 31 of the sub-case 30 and the positive pressure valve 40 in the valve case 15. As a result, the positive pressure valve 40 is urged to abut on the positive pressure valve seat 25 of the valve case 15, whereby the thin portion 47 of the annular sealing member 45 of the positive pressure valve 40 placed on the placing face 51b is made to abut on the positive pressure valve seat 25 in a normal state (see FIG. 2). When the pressure in the fuel tank rises to a predetermined value or more, and the positive pressure valve 40 is pressed by a fuel vapor, the spring 41 is compressed. As a result, the positive pressure valve 40 is made to slide in the valve chamber V to cause the thin portion 47 of the annular sealing member 45 to separate from the positive pressure valve seat 25 to thereby open the opening on the inner side of the positive pressure valve seat 25 (see FIG. 8).

Next, the negative pressure valve 70 will be described. The negative pressure valve 70 is made from an elastic resin material. The negative pressure valve 70 is mounted on the retainer 60 to so as to abut on and separate from the negative pressure valve seat 65. In a normal state, the negative pressure valve 70 abuts on the negative pressure valve seat 65 to thereby close the communicating passages 63. And, the negative pressure valve 70 separates from the communicating passages 63 to thereby open the communicating passages 63 when the pressure in the fuel tank falls to a predetermined value or less.

As shown in FIGS. 1 and 6, the negative pressure valve 70 includes the flange portion 71 and the shaft portion 75. The flange portion 71 has a circular shape. The shaft portion 75 extends from the center on the back surface of the flange portion 71. The flange portion 71 includes the supporting portion 72 thicker than the flange portion 71 in its center on the inside diameter side. The supporting portion 72 is inserted to be disposed in the recess portion 62a of the retainer 60. The flange portion 71 according to the present embodiment functions as a so-called umbrella-shaped flange that expands diagonally outward into an umbrella shape toward the distal end of the shaft portion 75 as shown in FIG. 6.

The shaft portion 75 extends from the center on the back surface of the supporting portion 72 of the flange portion 71, and is inserted into the insertion hole 62 of the retainer 60 and the cylindrical portion 66. The negative pressure valve 70 further includes a bulge portion 76 bulging into a chevron shape from the shaft portion 75 in the middle of the axial direction, and the fitting recess portion 77 disposed between the bulge portion 76 and the supporting portion 72 and arranged to fit the negative pressure valve-fitting portion 68 of the retainer 60.

The shaft portion 75 of the negative pressure valve 70 is made to pass through the insertion hole 62 to be inserted into the cylindrical portion 66 of the retainer 60, and the negative pressure valve-fitting portion 68 of the retainer 60 is made to fit the fitting recess portion 77 of the negative pressure valve 70, whereby the negative pressure valve 70 is mounted on the retainer 60. In this state, the negative pressure valve seat 65 of the retainer 60 abuts on the back surface of the outer rim of the flange portion 71, whereby the plural communicating passages 63 are closed (see FIG. 7). In the above-described state, the negative pressure valve seat 65 presses the outer rim of the flange portion 71 to warp the umbrella-shaped flange portion 71 into a linear shape, whereby the flange portion 71 is made to elastically abut on the negative pressure valve seat 65 as shown in FIG. 7.

In the present embodiment, as shown in FIG. 7, the flange portion 71 has an outside diameter D3 larger than an inside diameter D2 of the annular sealing member 45 and smaller than an outside diameter D1 of the annular sealing member 45 (a relation of D2<D3<D1 holds). In this case, a center C2 of the annular sealing member 45 and a center C3 of the flange portion 71 of the negative pressure valve 70 are aligned with an axial center C1 of the valve main body 50.

In the negative pressure valve 70 according to the present embodiment, the supporting portion 72 is provided to the flange portion 71. However, the supporting portion 72 may be dispensable, or the flange portion 71 may not have an umbrella shape but may have a flat plate shape or the like. There is no specific limitation as to the shape of the negative pressure valve. Meanwhile, it is preferable that the negative pressure valve should have a structure of fitting at least a flange portion, a shaft portion, and a retainer.

The negative pressure valve 70 is made from an elastic resin material such as rubber and elastomer similarly to the annular sealing member 45.

Next, the operation and advantageous effect of the check valve 10 will be described.

First, assembly work of assembling the annular sealing member 45, the retainer 60, and the negative pressure valve 70 to the valve main body 50 of the positive pressure valve 40 will be described with reference to FIGS. 5 to 7.

First, the supporting protrusion 52 of the valve main body 50 is inserted to be disposed on the inner periphery side of the thick portion 46 of the annular sealing member 45, whereby the thick portion 46 is placed on the inside diameter side of the placing face 51b of the valve main body 50 and the abutting protrusion 53 is made to abut on the back surface of the thin portion 47 of the annular sealing member 45, and thus the thin portion 47 is placed on the placing face 51b while having a predetermined space therebetween as shown in FIG. 5.

In this state, the thick portion 46 of the annular sealing member 45 is disposed between the supporting protrusion 52 and the abutting protrusion 53 of the valve main body 50 while the thin portion 47 of the annular sealing member 45 is disposed on the outside diameter side of the abutting protrusion 53 (see FIG. 5). Since the supporting protrusion 52 of the valve main body 50 is inserted to be disposed on the inner periphery side of the thick portion 46, positional deviation of the annular sealing member 45 is limited, which allows the center C2 of the annular sealing member 45 to be aligned with the axial center C1 of the valve main body 50.

The cylindrical portion 66 of the retainer 60 is inserted from its distal end side into the through-hole 51a of the valve main body 50 in the above-described state as indicated by the arrow in FIG. 5. Then, the cylindrical portion 66 passes through the through-hole 51a of the valve main body 50 to be inserted among the plural fitting pawls 58 to be pushed thereinto while warping the fitting pawls 58 outward, and when the distal end portion of the fitting pawls 58 reaches the fitting recess portion 67 of the cylindrical portion 66, the fitting pawls 58 flexibly return to fit the fitting recess portion 67, whereby the annular sealing member 45 is mounted on the valve main body 50 in a state where the annular sealing member 45 is sandwiched between the sandwiching portion 61 of the retainer 60 and the placing face 51b of the valve main body 50 (see FIG. 6). At the same time, the sandwiching portion 61 of the retainer 60 abuts on the thick portion 46 of the annular sealing member 45, and the annular sealing member 45 is sandwiched between the sandwiching portion 61 and the placing face 51b of the valve main body 50 (see FIG. 6).

Then, the shaft portion 75 of the negative pressure valve 70 is inserted from its distal end side into the insertion hole 62 of the retainer 60 as indicated by the arrow in FIG. 6. Thus, the bulge portion 76 of the negative pressure valve 70 is inserted thereinto while pressed by the negative pressure valve-fitting portion 68 of the retainer 60, and when the bulge portion 76 surmounts the negative pressure valve-fitting portion 68, the negative pressure valve-fitting portion 68 fits the fitting recess portion 77, and at the same time, the back surface of the outer rim of the flange portion 71 abuts on the negative pressure valve seat 65 of the retainer 60, whereby the negative pressure valve 70 is mounted on the retainer 60 (see FIG. 7).

At this time, since the supporting portion 72 of the flange portion 71 is inserted into the recess portion 62a of the retainer 60, positional deviation of the supporting portion 72 is prevented, which allows the axial center C1 of the valve main body 50 to be aligned with the center C3 of the flange portion 71 (see FIG. 7).

As described above, in the check valve 10, the annular sealing member 45 can be sandwiched between the sandwiching portion 61 of the retainer 60 and the placing face 51b of the valve main body 50 by mounting the retainer 60 on the valve main body 50 in a state where the annular sealing member 45 is placed on the placing face 51b of the valve main body 50. In this state, the annular sealing member 45 and the negative pressure valve 70 can be attached to the valve main body 50 with the use of the retainer 60 by mounting the negative pressure valve 70 on the retainer 60. Thus, the annular sealing member 45, the retainer 60, and the negative pressure valve 70 can be attached to the valve main body 50 from the same side. Therefore, the check valve 10 can adopt a relatively simple structure while improving workability of assembling the annular sealing member 45, the retainer 60, and the negative pressure valve 70 to the valve main body 50.

Since the negative pressure valve seat 65 is provided to the sandwiching portion 61 in the present embodiment, a mounting structure (e.g., the negative pressure valve-fitting portion 68) for the negative pressure valve 70 can be more easily provided to the retainer 60, which can more improve the assembling workability. If the negative pressure valve seat 65 is provided to the base end face of the cylindrical portion 66, a mounting structure for the negative pressure valve 70 is not easily provided to the retainer 60.

In the present embodiment, as shown in FIG. 7, the flange portion 71 has the outside diameter D3 larger than the inside diameter D2 of the annular sealing member 45 and smaller than the outside diameter D1 of the annular sealing member 45 (a relation of D2<D3<D1 holds). In this case, the center C2 of the annular sealing member 45 and the center C3 of the flange portion 71 of the negative pressure valve 70 are aligned with the axial center C1 of the valve main body 50. With this configuration, when the annular sealing member 45 and the retainer 60 are mounted on the valve main body 50, the flange portion 71 of the negative pressure valve 70 overlaps with the valve main body 50 and the annular sealing member 45 in the radial direction, which can make the positive pressure valve 40 compact (see FIG. 7).

Further in the present embodiment, since the valve main body 50 includes the retainer fitting portion (the plural fitting pawls 58 in the present embodiment) disposed at the position on the inside diameter side of the annular sealing member 45 placed on the placing face 51b and arranged to fit the retainer 60 as shown in FIG. 6, the retainer 60 can be mounted on the valve main body 50 in a compact form.

In the present embodiment, since the retainer 60 includes the negative pressure valve-fitting portion 68, which the shaft portion 75 of the negative pressure valve 70 fits, provided on the inner side of the portion of the retainer 60, the portion fitting the retainer fitting portion (the fitting pawls 58) as shown in FIG. 6, the negative pressure valve 70 can be mounted on the retainer 60 in a compact form.

The positive pressure valve 40 in which the annular sealing member 45 and the negative pressure valve 70 are attached to the valve main body 50 via the retainer 60 as described above is disposed in the valve chamber V of the valve case 15. In the check valve 10 including these constituent elements is located inside the fuel tank or outside the fuel tank with the use of clips or brackets (not illustrated). In this case, a pipe, which is located inside the fuel tank and is connected with a cut valve and the like, is connected with the first connecting portion 22 of the case main body 20. A pipe, which is connected with a canister and the like located outside the fuel tank, is connected with the second connecting portion 33 of the sub-case 30.

As shown in FIG. 2, when the pressure in the fuel tank falls to a predetermined value or less, the thin portion 47 of the annular sealing member 45 of the valve element 40 urged by the urging force of the spring 41 elastically abuts on the positive pressure valve seat 25 to close the opening on the inner side of the positive pressure valve seat 25. The outer rim of the flange portion 71 of the negative pressure valve 70 elastically abuts on the negative pressure valve seat 65 of the retainer 60 to close the plural communicating passages 63.

When the pressure in the fuel tank rises to a predetermined value or more in the above-described state, a fuel vapor and the like flows into the valve chamber V through the first connecting portion 22 to press the positive pressure valve 40. Then, the valve element 40 slides toward the sub-case 30 against the urging force of the spring 41, and the thin portion 47 of the annular sealing member 45 of the positive pressure valve 40 separates from the positive pressure valve seat 25 to thereby open the opening on the inner side of the positive pressure valve seat 25 as shown in FIG. 8. Then, as indicated by the arrows in FIG. 8, the fuel vapor flows between the inner periphery of the case main body 20 and the outer periphery of the valve element 40 while passing through the opening portions 56 of the outer peripheral portion 55 of the valve main body 50 to flow into the opening portion 32 of the sub-case 30 and to be sent to the inside of the second connecting portion 33 and the canister and the like via a pipe (not illustrated) to be discharged outside the fuel tank, which can reduce the pressure in the fuel tank.

When the pressure in the fuel tank falls to the predetermined value or less with respect to outside air pressure, the outside air is introduced into the valve chamber V from the opening portion 32 via the inside of the second connecting portion 33 of the sub-case 30. The outside air flows inside the spring 41 to pass between the plural fitting pawls 58 and through the through-hole 51a of the valve main body 50, and will flow out of the plural communicating passages 63 of the retainer 60. Thus, the flange portion 71 of the negative pressure valve 70 is elastically deformed like rolling up to separate from the negative pressure valve seat 65 of the retainer 60 as shown in FIG. 9, so that the outside air flows into the first connecting portion 22 to be sent into the fuel tank via a pipe (not illustrated), which can raise the pressure in the fuel tank.

Figure 10:
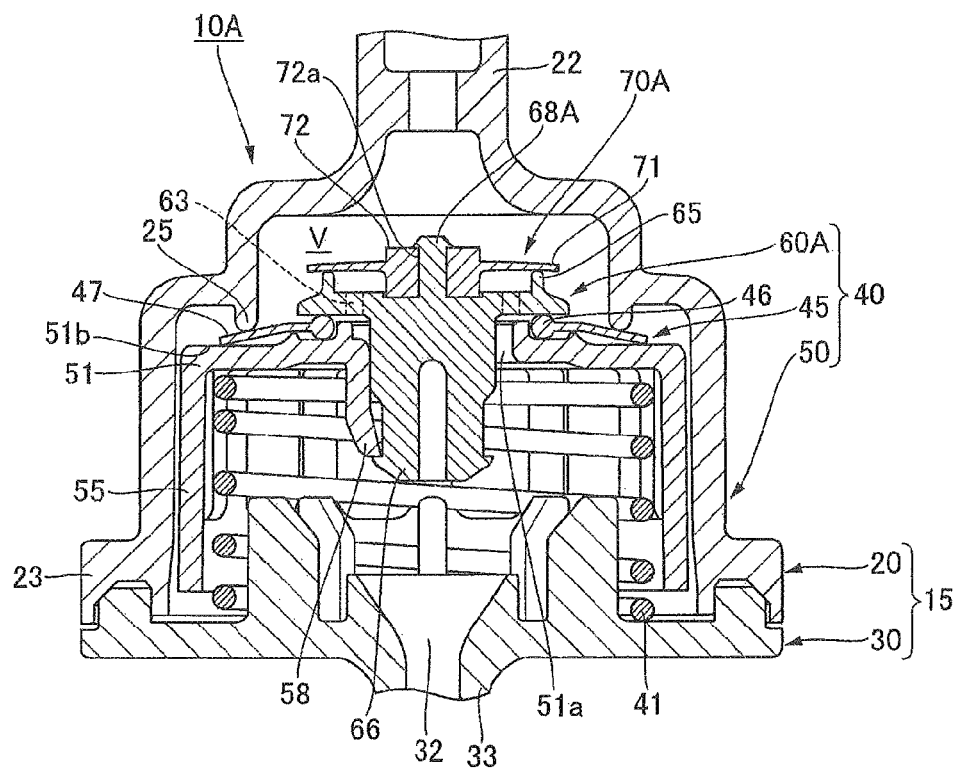
FIG. 10 is a cross-sectional view of a check valve according to another embodiment.

A check valve according to another embodiment is shown in FIG. 10. The same reference numerals are provided to the constituent elements that are substantially same as those in the above-described embodiment, and explanations of those constituent elements are omitted.

A check valve 10A according to the present embodiment includes a retainer and a negative pressure valve that are different in structure from those of the above-described embodiment as shown in FIG. 10.

A retainer 60A according to the present embodiment includes a negative pressure valve-fitting portion 68A having a shaft shape and protruding from the center on the placing face 51b. The distal end portion of the negative pressure valve-fitting portion 68A is larger in diameter than the other portions of the negative pressure valve-fitting portion 68A. A negative pressure valve 70A includes a fitting hole 72a, into which the shaft-shaped negative pressure valve-fitting portion 68A is inserted to fit, in the center of the supporting portion 72 of the flange portion 71. Thus, making the negative pressure valve-fitting portion 68A fit the fitting hole 72a allows the negative pressure valve 70A to be mounted on the retainer 60A (see FIG. 10).

The present invention is not limited to the embodiments described above, and that it is also possible to add a variety of modifications to the embodiments. Such modifications will also fall within the scope of the present invention.

The invention claimed is:

1. A check valve mounted on a fuel tank of an automobile, the check valve comprising:
    a valve case comprising:
        a first connecting portion connected with a pipe which is to be communicated with the fuel tank;
        a second connecting portion connected with a pipe which is to be communicated with a canister disposed outside the fuel tank;
        a valve chamber formed inside the valve case; and
        a positive pressure valve seat provided in a portion ranging from the valve chamber to the first connecting portion;
    a positive pressure valve slidably disposed in the valve chamber to abut on and separate from the positive pressure valve seat; and
    a spring disposed in the valve case configured to urge to make the positive pressure valve abut on the positive pressure valve seat, and to be compressed to thereby open the positive pressure valve when a pressure in the fuel tank rises to a predetermined value or more,
    wherein the positive pressure valve comprises:
        a valve main body;
        an annular sealing member made from an elastic resin material, and mounted on the valve main body so as to abut on and separate from the positive pressure valve seat; and
        a retainer mounted on the valve main body so as to sandwich the annular sealing member with the valve main body,
    wherein the valve main body comprises:
        a placing face on which the annular sealing member is placed,
    wherein the retainer comprises:
        a communicating passage disposed on an inside diameter side of the annular sealing member;
        a sandwiching portion formed to sandwich the annular sealing member with the placing face of the valve main body; and
        a negative pressure valve seat which communicates with the communicating passage,
    wherein the check valve further comprises a negative pressure valve made from an elastic resin material, and mounted on the retainer so as to abut on and separate from the negative pressure valve seat, such that the negative pressure valve closes the communicating passage in a normal state by abutting on the negative pressure valve seat, and opens the communicating passage when the pressure in the fuel tank falls to a predetermined value or less,
    wherein the retainer includes a cylindrical portion, wherein the sandwiching portion includes a portion having a flange shape which extends radially outward from an outer circumference of the cylindrical portion, and
    wherein the negative pressure valve seat is formed in the portion of the sandwiching portion having the flange shape.

2. The check valve according to claim 1,
    wherein the negative pressure valve comprises a flange portion having a circular shape, and
    wherein the flange portion has an outside diameter larger than an inside diameter of the annular sealing member and smaller than an outside diameter of the annular sealing member in a state where an axial center of the valve main body, a center of the annular sealing member and a center of the flange portion of the negative pressure valve are aligned.

3. The check valve according to claim 1,
    wherein the valve main body comprises a retainer fitting portion disposed at a position corresponding to an inside diameter side of the annular sealing member being placed on the placing face, and configured to fit the retainer.

4. The check valve according to claim 3,
    wherein the negative pressure valve comprises a flange portion having a circular shape, and a shaft portion extending from a center on a back surface of the flange portion, and
    wherein the retainer comprises a negative pressure valve-fitting portion into which the shaft portion of the negative pressure valve fits, the negative pressure valve-fitting portion being disposed on an inner side of a portion of the retainer so as to fit the retainer fitting portion.

5. The check valve according to claim 1, wherein the valve main body further comprises an abutting protrusion that separates the annular sealing member from the valve main body, and
    wherein the abutting protrusion causes the annular sealing member to separate from the placing face with a predetermined space when the positive pressure valve slides against the urging force of the spring and the positive pressure valve seat opens.

6. The check valve according to claim 1, wherein the negative pressure valve seat and the sandwiching portion form a single member.

7. The check valve according to claim 1, wherein the annular sealing member comprises:
    a first portion; and
    a second portion having a thickness less than a thickness of the first portion.

8. The check valve according to claim 7, wherein the first portion has an annular shape on an inner side, and
    wherein the second portion has a flange shape having a thickness less than the thickness of the first portion and extends in a radial outer direction from a rim of the first portion.

9. The check valve according to claim 7, wherein the sandwiching portion has an outside diameter greater than an outside diameter of the first portion of the annular sealing member, and is disposed so as to reach a top surface of the second portion beyond the outside diameter of the first portion when the first portion is sandwiched between the sandwiching portion and the placing face of the valve main body.

10. The check valve according to claim 1, wherein the valve main body further comprises a supporting protrusion having an annular shape that protrudes from a rim on a top side of a through-hole of the valve main body, and wherein the supporting protrusion sandwiches the annular sealing member between the sandwiching portion of the retainer and the placing face in a state where the annular sealing member is placed on the placing face.

11. The check valve according to claim 1, wherein the sandwiching portion has an outside diameter greater than an outside diameter of a first portion of the annular sealing member, and is disposed so as to reach a top surface of a second portion of the annular sealing member beyond the outside diameter of the first portion when the first portion is sandwiched between the sandwiching portion and the placing face of the valve main body.

* * * * *